United States Patent [19]
Takagi et al.

[11] Patent Number: 5,894,209
[45] Date of Patent: Apr. 13, 1999

[54] APPARATUS FOR AND METHOD OF CONTROLLING STEPPING MOTOR

[75] Inventors: Keiichi Takagi; Keiji Ogura; Koji Yanoguchi, all of Tokorozawa, Japan

[73] Assignee: Pioneer Electronic Corporation, Japan

[21] Appl. No.: 09/064,755

[22] Filed: Apr. 23, 1998

[30] Foreign Application Priority Data

Apr. 24, 1997 [JP] Japan ................... 9-107928

[51] Int. Cl.$^6$ .................................. H02P 8/00
[52] U.S. Cl. .................. 318/696; 318/685; 318/138; 318/254; 318/439; 318/779; 388/811; 388/815
[58] Field of Search .................. 318/696, 685, 318/138, 254, 439, 779; 388/811, 815

[56] References Cited

U.S. PATENT DOCUMENTS

| | | | |
|---|---|---|---|
| 5,503,131 | 4/1996 | Ohuchi | 318/696 X |
| 5,583,620 | 12/1996 | Miyamoto | 318/254 X |

*Primary Examiner*—Karen Masih
*Attorney, Agent, or Firm*—Nixon & Vanderhye

[57] ABSTRACT

An apparatus for controlling a stepping motor used for moving a carriage having a pickup from a first position to a second position, the apparatus having: a calculating device for calculating a moving distance between the first position and the second position; a setting device for setting an acceleration area to accelerate the stepping motor and a deceleration area to decelerate the stepping motor, on the basis of the moving distance; and a driving device for driving the stepping motor by a one-two-phase excitation method until rotation velocity of the stepping motor increases to a predetermined velocity in the acceleration area, driving the stepping motor by a two-phase excitation method after rotation velocity of the stepping motor increases to the predetermined velocity in the acceleration area, driving the stepping motor by the two-phase excitation method until rotation velocity of the stepping motor decreases to the predetermined velocity in the deceleration area, and driving the stepping motor by the one-two-phase excitation method after rotation velocity of the stepping motor decreases to the predetermined velocity in the deceleration area.

18 Claims, 9 Drawing Sheets

APPARATUS FOR AND METHOD OF CONTROLLING STEPPING MOTOR

BACKGROUND OF THE INVENTION

1. Field of the Invention

The present invention relates to an apparatus for and a method of controlling a stepping motor used for a carriage driving mechanism of an optical pickup such as a pickup for a CD player and the like.

2. Description of the Related Art

A CD player or the like has a device for moving a carriage of an optical pickup on a recording medium shaped like a disc, such as a CD (Compact Disc) and the like. In such a CD player, in order to move the carriage in the radial direction accurately and quickly, a positioning control is performed, and a stepping motor is used for the positioning control.

Furthermore, a trapezoidal shape driving method is typically used for the positioning control. As shown in FIG. 6, according to the trapezoidal shape driving method, acceleration and deceleration are rectilinearly performed, and a constant velocity period is set between an accelerating period and a decelerating period.

In FIG. 6, an abscissa is the number of steps of the stepping motor from a present position, and an ordinate is the response frequency of the stepping motor. In FIG. 6, "fs" means a maximum response frequency, and "$f_o$" means a self-starting frequency.

The acceleration and the deceleration are realized by changing the response frequency of the stepping motor, i.e., an interval of a pulse to be used for exciting the stepping motor, under control of a CPU installed in a control device. The constant velocity driving is realized by making the interval of the pulse constant.

As shown in FIG. 6, the acceleration is performed by increasing the response frequency as high as possible, and then, the constant velocity driving is performed, thereafter, the deceleration is performed by decreasing the response frequency in the same rate as the acceleration. According to this manner, it is possible to move the carriage to a target position quickly.

As an excitation method for driving the stepping motor, a two-phase excitation method can be used. If the two-phase excitation method is used for driving the stepping motor, it is possible to make the response frequency high. Therefore, the two-phase excitation is preferably used for a high velocity driving. However, in the two-phase excitation, as the range of movement corresponding to one pulse is large, a large disturbance arises in an actuator for holding an objective of the optical pickup with aid of a spring. Such a large disturbance is adversely affect the positioning control. Accordingly, the one-two-phase excitation method, which is an excitation method in the middle of the one-phase excitation and the two-phase excitation, is preferably used for the positioning control.

Here, the positioning control using the one-two-phase excitation according to the trapezoidal shape driving method is explained with reference to FIG. 6.

In order to move the carriage from a present position to a target position, at first, a distance between the present address to the target address is calculated, and the total number of steps is calculated on the basis of the calculated distance. In case that 1 step in a microstep method is used as the unit of counting the number of steps, the total number of steps Sa is obtained by dividing the calculated distance by a distance of movement corresponding to 1 step in the microstep method.

Next, the position of the rotor of the stepping motor is adjusted by using the microstep method in order to move the rotor position to a one-two-phase excitation position before the acceleration is performed by using the one-two-phase excitation method. Actually, the number of steps Sb corresponding to a distance from the present position to the one-two-phase excitation position closest to the present position is calculated.

Furthermore, a position adjustment called the landing is performed between the end of the deceleration and the stopping. The number of steps Sc necessary for the landing is set in advance.

Then, in case that 1 step in the one-two-phase excitation method corresponds to 8 steps in the microstep method, the number of the steps Sd necessary for the acceleration, the deceleration and the constant velocity driving is calculated by the following expression.

$$d=(a-(b+c))/8$$

Next, the number of steps Sd is divided by three to thereby calculate the number of steps Se necessary for the acceleration, the number of steps Sf necessary for the constant velocity driving and the number of steps Sg necessary for the deceleration respectively. When it is determined that the response frequency exceeds the maximum frequency fs if the acceleration is performed by the number of steps Se, the number of steps S1 is set as the number of steps Se and the number of steps Sg respectively. Here, the "S1" is the number of steps required to increase the response frequency to the maximum response frequency fs. In this case, the number of steps "d−(e+g)" is set as the number of steps Sf.

Thereafter, as shown in FIG. 6, the stepping motor is driven on the basis of the numbers of steps Sb, Se, Sf, Sg and Sc. Namely, at first, the rotor of the stepping motor is moved by the microstep method until the number of steps reaches the number of steps Sb. Next, the stepping motor is driven by the one-two-phase excitation method until the number of steps reaches the number of steps Se. During this period, the stepping motor is accelerated according to the predetermined acceleration. Next, the stepping motor is driven by the one-two-phase excitation until the number of steps reaches the number of steps Sf. During this period, the stepping motor is rotated in a constant velocity. Next, the stepping motor is driven by the one-two-phase excitation method until the number of steps reaches the number of steps Sg. During this period, the stepping motor is decelerated according to the predetermined deceleration. Next, the stepping motor is driven by the microstep method until the number of steps reaches the number of steps Sc, in order to perform the landing. Then, the stepping motor is accurately stopped at the target position.

In the above mentioned operation, in the acceleration, the deceleration and the constant velocity driving, the stepping motor is always driven by the one-two-phase excitation method. Therefore, there is a problem that it is impossible to make torque high and it is impossible to make maximum velocity high.

Namely, in the case that the stepping motor is driven by the one-two-phase excitation, there is a difference between torque generated by the one-phase excitation and torque generated by the two-phase excitation, and thereby, the torque frequently changes. Therefore, in case that the one-two-phase excitation is used for driving the stepping motor, it is necessary to make the maximum response frequency lower due to dispersion of a load, as compared with the maximum response frequency in the case that the two-phase excitation is used.

On the other hand, if the stepping motor is always driven by using the two-phase excitation in the acceleration, the deceleration and the constant velocity driving, since the range of movement corresponding to one pulse is large, a large disturbance arises in an actuator for holding an objective of the optical pickup, as mentioned above.

SUMMARY OF THE INVENTION

It is therefore an object of the present invention to provide an apparatus for and a method of controlling a stepping motor which can make a maximum velocity of the stepping motor higher and improve stability of the stepping motor.

According to the present invention, the aforementioned object can be achieved by an apparatus for controlling a stepping motor used for moving a movable body from a first position to a second position, the apparatus having: a calculating device for calculating a moving distance between the first position and the second position; a setting device for setting an acceleration area to accelerate the stepping motor and a deceleration area to decelerate the stepping motor, on the basis of the moving distance; and a driving device for driving the stepping motor by a one-two-phase excitation method until rotation velocity of the stepping motor increases to a predetermined velocity in the acceleration area, driving the stepping motor by a two-phase excitation method after rotation velocity of the stepping motor increases to the predetermined velocity in the acceleration area, driving the stepping motor by the two-phase excitation method until rotation velocity of the stepping motor decreases to the predetermined velocity in the deceleration area, and driving the stepping motor by the one-two-phase excitation method after rotation velocity of the stepping motor decreases to the predetermined velocity in the deceleration area.

Here, if the movable body is moved from the first position to the second position, the stepping motor is accelerated, and thereby, the movable body begins to move from the first position with accelerating, and next, the stepping motor is decelerated, and thereby, the movable body approaches the second position with decelerating and then, the movable body stops at the second position. Thus, the movable body is accurately and quickly moved from the first position to the second position.

In order to realize such an operation, at first, the calculating device calculates the moving distance between the first position and the second position, and the setting device sets the acceleration area and the deceleration area on the basis of the moving distance. The acceleration area is a part of a moving period between the first position and the second position, and is an area to accelerating the stepping motor according to a predetermined acceleration. Namely, the stepping motor is accelerated during acceleration area. The deceleration area is a part of the moving period, and is an area to decelerating the stepping motor according to a predetermined deceleration. Namely, the stepping motor is decelerated during the deceleration area. The acceleration area and the deceleration area change with the moving distance respectively.

Then, the stepping motor is actually driven, and a travel of the movable body is stated. At first, in the acceleration area, the driving device drives the stepping motor by the one-two-phase excitation method until rotation velocity of the stepping motor increases to a predetermined velocity since acceleration of the stepping motor starts. When rotation velocity of the stepping motor reaches the predetermined velocity, the excitation method is changed over from the one-two-phase excitation method to the two-phase excitation method. Next, in the acceleration area, the driving device drives the stepping motor by the two-phase excitation method until acceleration of the stepping motor ends since rotation velocity of the stepping motor exceeds the predetermined velocity. Next, in the deceleration area, the driving device drives the stepping motor by the two-phase excitation method until rotation velocity of the stepping motor decreases to the predetermined velocity since deceleration of the stepping motor starts. When rotation velocity of the stepping motor reaches the predetermined velocity, the excitation method is changed over from the two-phase excitation method to the one-two-phase excitation method. Next, in the deceleration area, the driving device drives the stepping motor by the one-two-phase excitation method until deceleration of the stepping motor ends since rotation velocity of the stepping motor decreases below the predetermined velocity. In addition, a constant velocity area to move the movable body in constant velocity may be set between the end of the acceleration area and the beginning of the deceleration area.

Thus, the stepping motor is driven by the one-two-phase excitation method in the beginning part and the ending part of the moving period in which the movable body moves between the first position and the second position. Thereby, vibration of the movable body can be restricted in the beginning part and the ending part of the moving period. Accordingly, it is possible to move the movable body to the second position accurately.

Furthermore, the stepping motor is driven by the two-phase excitation method in the middle part of the moving period. Thereby, it is possible to make rotation velocity of the stepping motor higher. Accordingly, the movable body can be quickly moved from the first position to the second position.

Moreover, if the predetermined velocity is a maximum rotation velocity of the stepping motor in case that the stepping motor is driven by the one-two-phase excitation method, the movable body can be more accurately and quickly moved from the first position to the second position.

According to the present invention, the aforementioned object can be also achieved by an apparatus for controlling a stepping motor used for moving a movable body from a first position to a second position, the apparatus having: a calculating device for calculating the total number of steps between the first position and the second position; a setting device for setting an acceleration area to accelerate the stepping motor and a deceleration area to decelerate the stepping motor, on the basis of the total number of steps; and a driving device for driving the stepping motor by a one-two-phase excitation method until the number of steps reaches a first predetermined number in the acceleration area, driving the stepping motor by a two-phase excitation method after the number of steps reaches the first predetermined number in the acceleration area, driving the stepping motor by the two-phase excitation method until the number of steps reaches a second predetermined number in the deceleration area, and driving the stepping motor by the one-two-phase excitation method after the number of steps reaches the second predetermined number in the deceleration area.

During the acceleration area, the stepping motor is accelerated in a predetermined acceleration. Therefor, if counting the number of steps of the stepping motor since the stepping motor begins to accelerate in the acceleration area, it is possible to obtain a rotation velocity of the stepping motor on the basis of the number of steps and the predetermined acceleration. Similarly, during the deceleration area, the stepping motor is decelerated in a predetermined deceleration. Therefor, if counting the number of steps of the stepping motor since the stepping motor begins to decelerate in the deceleration area, it is possible to obtain a rotation velocity of the stepping motor on the basis of the number of steps and the predetermined deceleration. Consequently, it is possible to determine the points to change over the excitation method on the basis of the number of steps of the stepping motor.

Namely, the calculating device calculates the total number of steps necessary for moving the movable body from the first position to the second position. Next, the setting device sets the acceleration area and the deceleration area on the basis of the total number of steps.

Then, the stepping motor is actually driven, and a travel of the movable body is stated. At first, in the acceleration area, the driving device drives the stepping motor by the one-two-phase excitation method until the number of steps reaches the first predetermined number since acceleration of the stepping motor starts. When the number of steps reaches the first predetermined number, the excitation method is changed over from the one-two-phase excitation method to the two-phase excitation method. Next, in the acceleration area, the driving device drives the stepping motor by the two-phase excitation method until acceleration of the stepping motor ends since the number of steps exceeds the first predetermined number. Next, in the deceleration area, the driving device drives the stepping motor by the two-phase excitation method until the number of steps reaches the second predetermined number since deceleration of the stepping motor starts. When the number of the steps reaches the second predetermined number, the excitation method is changed over from the two-phase excitation method to the one-two-phase excitation method. Next, in the deceleration area, the driving device drives the stepping motor by the one-two-phase excitation method until deceleration of the stepping motor ends since the number of steps exceeds the second predetermined number. In addition, a constant velocity area to move the movable body in constant velocity may be set between the end of the acceleration area and the beginning of the deceleration area.

Thus, the stepping motor is driven by the one-two-phase excitation method in the beginning part and the ending part of the moving period in which the movable body moves between the first position and the second position. Thereby, vibration of the movable body can be restricted in the beginning part and the ending part of the moving period. Accordingly, it is possible to move the movable body to the second position accurately.

Furthermore, the stepping motor is driven by the two-phase excitation method in the middle part of the moving period. Thereby, it is possible to make rotation velocity of the stepping motor higher. Accordingly, the movable body can be quickly moved from the first position to the second position.

Moreover, if the first predetermined number is the number of steps required that rotation velocity of the stepping motor increases to a predetermined velocity in the acceleration area, the second predetermined number is the number of steps required that rotation velocity of the stepping motor decreases to the predetermined velocity in the deceleration area, and the predetermined velocity is a maximum rotation velocity of the stepping motor in case that the stepping motor is driven by the one-two-phase excitation method, the movable body can be more accurately and quickly moved from the first position to the second position.

Here, in order to change over the excitation method from the one-two-phase excitation method to the two-phase excitation method smoothly, it is preferable to set the rotor position at the two-phase excitation position at the time of changing over the excitation method. The rotation position at the time of changing over the excitation method is determined by the rotation position at the beginning of the acceleration area and the number of steps until the excitation method is changed over since acceleration of the stepping motor starts at the beginning of the acceleration area. The number of steps until the excitation method is changed over since acceleration of the stepping motor starts at the beginning of the acceleration area is equal to the first predetermined number.

Therefore, the apparatus further has an excitation position selecting device and a rotor position adjusting device. The excitation position selecting device selects either one of the one-phase excitation position and the two-phase excitation position as the excitation position at a beginning of the acceleration area, on the basis of the first predetermined number. Next, the rotor position adjusting device moves the rotor of the stepping motor to the selected excitation position by using a microstep method before acceleration of the stepping motor starts.

According to the present invention, the aforementioned object can be achieved by an apparatus for controlling a stepping motor used for moving a movable body from a first position to a second position, the apparatus having: a total number calculating device for calculating the total number of steps between the first position and the second position; a setting device for setting an acceleration area to accelerate the stepping motor and a deceleration area to decelerate the stepping motor, on the basis of the total number of steps; a step number calculating device for calculating the number of steps necessary for accelerating the stepping motor during the acceleration area; a driving pattern selecting device for selecting a first driving pattern wherein the stepping motor is driven by only a one-two-phase excitation method during the acceleration area and during the deceleration area, if the calculated number of steps necessary for accelerating is less than a first predetermined number, and selecting a second driving pattern wherein the stepping motor is driven by the one-two-phase excitation method until the number of steps reaches the first predetermined number in the acceleration area, driven by a two-phase excitation method after the number of steps reaches the first predetermined velocity in the acceleration area, driven by the two-phase excitation method until the number of steps reaches a second predetermined number in the deceleration area, and driven by the one-two-phase excitation method after the number of steps reaches the second predetermined number in the deceleration area, if the calculated number of steps necessary for accelerating is not less than the first predetermined number; and a driving device for driving the stepping motor by the selected driving pattern.

Namely, if the number of steps necessary for accelerating the stepping motor during the acceleration area can be obtained, it is possible to know the maximum rotation velocity of the stepping motor in the moving period in which the movable body moves between the first position and the second position. Therefore, the step number calculating device calculates the number of steps necessary for accelerating the stepping motor during the acceleration area.

If a moving distance between the first position and the second position is relatively short, the acceleration area is also short. Thereby, as the rotation velocity of the stepping motor does not become so high, the maximum rotation velocity of the stepping motor is less than the predetermined velocity. In this case, the stepping motor may be driven by only the one-two-phase excitation method during the acceleration area and during the deceleration area, in order to move the movable body accurately. On the other hand, if the moving distance is relatively long, the maximum rotation velocity of the stepping motor is not less than the predetermined velocity. In this case, the stepping motor may be driven by the one-two-phase excitation method in the beginning part the moving period and in the ending part of the moving period, and driven by the two-phase excitation method in the middle part of the moving period, in order to move the movable body accurately and quickly. Therefore, the driving pattern selecting device selects the first driving pattern if the number of steps necessary for accelerating is less than a first predetermined number, and selects the second driving pattern if the number of steps necessary for accelerating is not less than the first predetermined number. Then, the driving device drives the stepping motor by the selected driving pattern. Consequently, the movable body can be accurately and quickly moved both of a short distance and a long distance.

Moreover, if the first predetermined number is the number of steps required that rotation velocity of the stepping motor increases to a predetermined velocity in the acceleration area, the second predetermined number is the number of steps required that rotation velocity of the stepping motor decreases to the predetermined velocity in the deceleration area, and the predetermined velocity is a maximum rotation velocity of the stepping motor in case that the stepping motor is driven by the one-two-phase excitation method, the movable body can be more accurately and quickly moved both of a short distance and a long distance.

According to the present invention, the aforementioned object can be achieved by an apparatus for controlling a stepping motor used for moving a carriage from a first position to a second position, the carriage having a pickup to read information from a disc on which a plurality of tracks are formed, the apparatus having: a calculating device for calculating the total number of tracks between the first position and the second position; a setting device for setting an acceleration area to accelerate the stepping motor and a deceleration area to decelerate the stepping motor, on the basis of the total number of tracks; and a driving device for driving the stepping motor by a one-two-phase excitation method until the number of tracks reaches a first predetermined number in the acceleration area, driving the stepping motor by a two-phase excitation method after the number of tracks reaches the first predetermined number in the acceleration area, driving the stepping motor by the two-phase excitation method until the number of tracks reaches a second predetermined number in the deceleration area, and driving the stepping motor by the one-two-phase excitation method after the number of tracks reaches the second predetermined number in the deceleration area.

The plurality of tracks are formed on the disc. Each track is arranged on the disc at a constant interval. Therefore, it is possible to know the moving distance on the basis of the number of tracks. Furthermore, it is possible to calculate the rotation velocity of the stepping motor on the basis the moving distance, the predetermined acceleration and the predetermined deceleration. Thus, it is possible to determine the points to change over the excitation method on the basis of the number of tracks.

Namely, the calculating device calculates the total number of tracks between the first position and the second position. Next, the setting device sets an acceleration area to accelerate the stepping motor and a deceleration area to decelerate the stepping motor, on the basis of the total number of tracks.

Then, the stepping motor is actually driven, and a travel of the movable body is stated. At first, in the acceleration area, the driving device drives the stepping motor by the one-two-phase excitation method until the number of tracks reaches the first predetermined number since acceleration of the stepping motor starts. When the number of tracks reaches the first predetermined number, the excitation method is changed over from the one-two-phase excitation method to the two-phase excitation method. Next, in the acceleration area, the driving device drives the stepping motor by the two-phase excitation method until acceleration of the stepping motor ends since the number of tracks exceeds the first predetermined number. Next, in the deceleration area, the driving device drives the stepping motor by the two-phase excitation method until the number of tracks reaches the second predetermined number since deceleration of the stepping motor starts. When the number of the tracks reaches the second predetermined number, the excitation method is changed over from the two-phase excitation method to the one-two-phase excitation method. Next, in the deceleration area, the driving device drives the stepping motor by the one-two-phase excitation method until deceleration of the stepping motor ends since the number of tracks exceeds the second predetermined number. In addition, a constant velocity area to move the movable body in constant velocity may be set between the end of the acceleration area and the beginning of the deceleration area.

Accordingly, the carriage can be accurately and quickly moved from the first position to the second position.

Moreover, if the first predetermined number is the number of tracks required that rotation velocity of the stepping motor increases to a predetermined velocity in the acceleration area, the second predetermined number is the number of tracks required that rotation velocity of the stepping motor decreases to the predetermined velocity in the deceleration area, and the predetermined velocity is a maximum rotation velocity of the stepping motor in case that the stepping motor is driven by the one-two-phase excitation method, the carriage can be more accurately and quickly moved from the first position to the second position.

According to the present invention, the aforementioned object can be also achieved by a method of controlling a stepping motor used for moving a movable body from a first position to a second position, the method having the processes of: calculating a moving distance between the first position and the second position; setting an acceleration area to accelerate the stepping motor and a deceleration area to decelerate the stepping motor, on the basis of the moving distance; driving the stepping motor by a one-two-phase excitation method until rotation velocity of the stepping motor increases to a predetermined velocity in the acceleration area; changing over the excitation method from the one-two excitation method to a two-phase excitation method when rotation velocity of the stepping motor increases to the predetermined velocity in the acceleration area; driving the stepping motor by the two-phase excitation method after rotation velocity of the stepping motor increases to the predetermined velocity in the acceleration area; further driving the stepping motor by the two-phase excitation method until rotation velocity of the stepping motor decreases to the predetermined velocity in the deceleration area; changing over the excitation method from the two-phase excitation method to the one-two-phase excitation method when rotation velocity of the stepping motor decreases to the predetermined velocity in the deceleration area; and driving the stepping motor by the one-two-phase excitation method after rotation velocity of the stepping motor decreases to the predetermined velocity in the deceleration area.

Thus, the stepping motor is driven by the one-two-phase excitation method in the beginning part and the ending part of the moving period in which the movable body moves between the first position and the second position. Thereby, vibration of the movable body can be restricted in the beginning part and the ending part of the moving period. Accordingly, it is possible to move the movable body to the second position accurately.

Furthermore, the stepping motor is driven by the two-phase excitation method in the middle part of the moving period. Thereby, it is possible to make rotation velocity of the stepping motor higher. Accordingly, the movable body can be quickly moved from the first position to the second position.

According to the present invention, the aforementioned object can be also achieved by a method of controlling a stepping motor used for moving a movable body from a first position to a second position, the method having the processes of: calculating the total number of steps between the first position and the second position; setting an acceleration area to accelerate the stepping motor and a deceleration area to decelerate the stepping motor, on the basis of the total number of steps; driving the stepping motor by a one-two-phase excitation method until the number of steps reaches a first predetermined number in the acceleration area; changing over the excitation method from the one-two excitation method to a two-phase excitation method when the number of steps reaches the first predetermined number in the acceleration area; driving the stepping motor by the two-phase excitation method after the number of steps reaches the first predetermined number in the acceleration area; further driving the stepping motor by the two-phase excitation method until the number of steps reaches a second predetermined number in the deceleration area; changing over the excitation method from the two-phase excitation method to the one-two-phase excitation method when the number of steps reaches the second predetermined number in the deceleration area; and driving the stepping motor by the one-two-phase excitation method after the number of steps reaches the second predetermined number in the deceleration area.

Accordingly, the movable body can be quickly moved from the first position to the second position.

If the process of selecting either one of a one-phase excitation position and a two-phase excitation position as an excitation position at a beginning of the acceleration area, on the basis of the first predetermined number, and the process of moving a rotor of the stepping motor to the selected excitation position by using a microstep method before acceleration of the stepping motor starts are added into the stepping motor control method, it is possible to change over the excitation method from the one-two-phase excitation method to the two-phase excitation method smoothly.

According to the present invention, the aforementioned object can be achieved by a method of controlling a stepping motor used for moving a movable body from a first position to a second position, the method having the processes of: calculating the total number of steps between the first position and the second position; setting an acceleration area to accelerate the stepping motor and a deceleration area to decelerate the stepping motor, on the basis of the total number of steps; calculating the number of steps necessary for accelerating the stepping motor in the acceleration area; selecting a first driving pattern wherein the stepping motor is driven by only a one-two-phase excitation method during the acceleration area and during the deceleration area, if the calculated number of steps necessary for accelerating is less than a first predetermined number, and selecting a second driving pattern wherein the stepping motor is driven by the one-two-phase excitation method until the number of steps reaches the first predetermined number in the acceleration area, driven by a two-phase excitation method after the number of steps reaches the first predetermined velocity in the acceleration area, driven by the two-phase excitation method until the number of steps reaches a second predetermined number in the deceleration area, and driven by the one-two-phase excitation method after the number of steps reaches the second predetermined number in the deceleration area, if the calculated number of steps necessary for accelerating is not less than the first predetermined number; and driving the stepping motor by the selected driving pattern.

Accordingly, the movable body can be accurately and quickly moved both of a short distance and a long distance.

According to the present invention, the aforementioned object can be also achieved by a method of controlling a stepping motor used for moving a carriage from a first position to a second position, the carriage having a pickup to read information from a disc on which a plurality of tracks are formed, the method having the processes of: calculating the total number of tracks between the first position and the second position; setting an acceleration area to accelerate the stepping motor and a deceleration area to decelerate the stepping motor, on the basis of the total number of tracks; driving the stepping motor by a one-two-phase excitation method until the number of tracks reaches a first predetermined number in the acceleration area; changing over the excitation method from the one-two excitation method to a two-phase excitation method when the number of tracks reaches the first predetermined number in the acceleration area; driving the stepping motor by the two-phase excitation method after the number of tracks reaches the first predetermined number in the acceleration area; further driving the stepping motor by the two-phase excitation method until the number of tracks reaches a second predetermined number in the deceleration area; changing over the excitation method from the two-phase excitation method to the one-two-phase excitation method when the number of tracks reaches the second predetermined number in the deceleration area; and driving the stepping motor by the one-two-phase excitation method after the number of tracks reaches the second predetermined number in the deceleration area.

Accordingly, the carriage can be accurately and quickly moved from the first position to the second position.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.
(First Embodiment)

Figure 1:
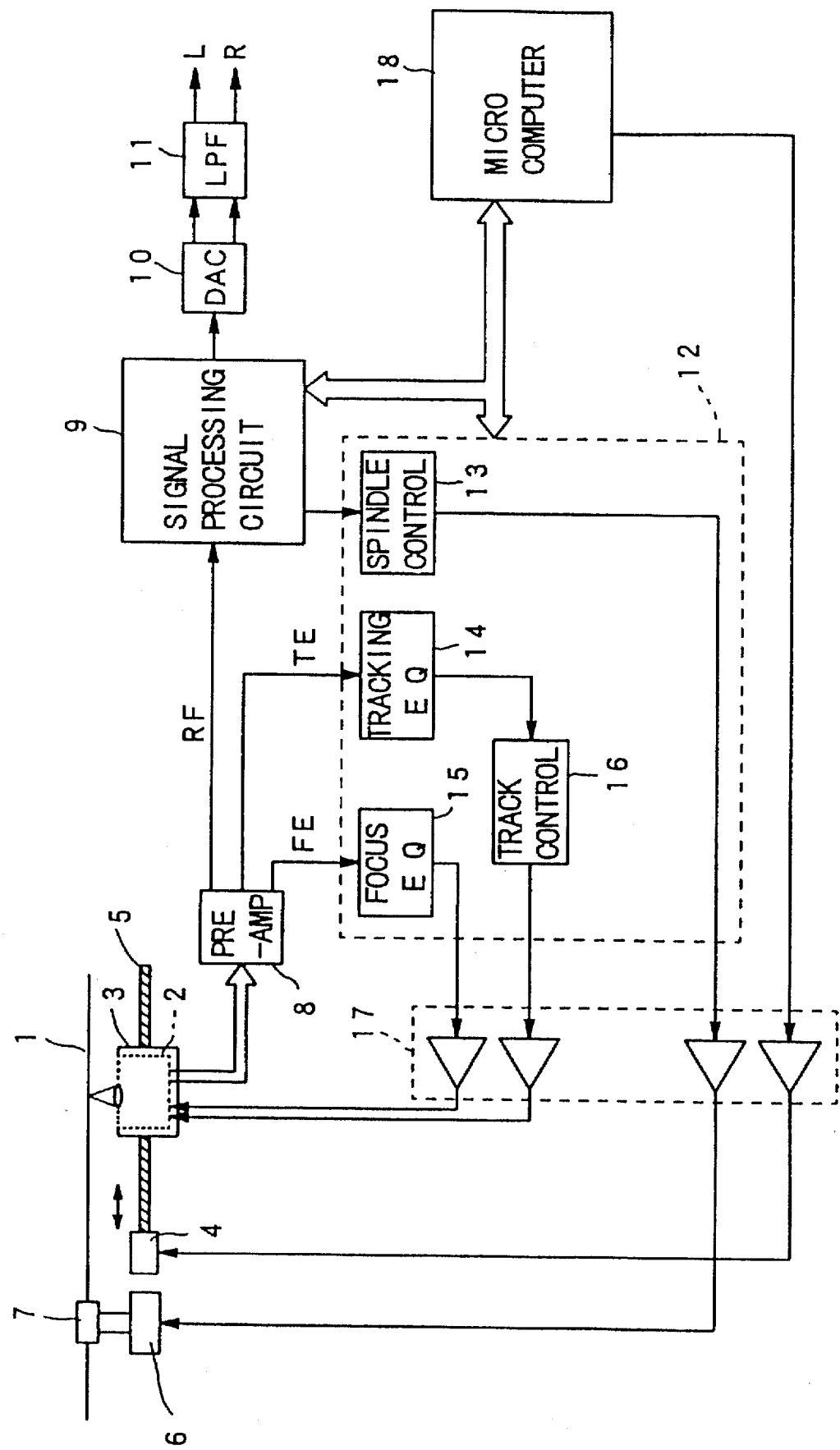
FIG. 1 is a block diagram showing a configuration of a CD reproducing apparatus of a first embodiment of the present invention.

FIG. 1 shows a configuration of a CD reproducing apparatus 100 of a first embodiment of the present invention.

As shown in FIG. 1, in the CD reproducing apparatus 100, a pickup 2 emits a laser light to an optical disc 1. The pickup 2 is held by a carriage 3. The carriage 3 can move in the radial direction of the optical disc 1 by a screw mechanism of a shaft 5. The shaft 5 is rotated by the stepping motor 4.

The optical disc 1 is by a shaft 7. The shaft 7 is rotated by a spindle motor 6, and the optical disc 1 rotates by a predetermined velocity. When the laser light is emitted from the pickup 2 to the optical disc 1, information recorded on the optical disc 1 in the circumferential and radial directions is read and outputted to a pre-amp 8 as a reproduction signal RF.

The reproduction signal RF is compensated and demodulated by a signal processing circuit 9 connected with the pre-amp 8, and outputted through a digital-analog converter (DAC) 10 and a low pass filter (LPF) 11. Accordingly, the information recorded on the optical disc 1 is reproduced.

Furthermore, in the signal processing circuit 9, a clock component of a modulation signal is extracted from the reproduction signal RF, and further, a pulse length is measured after the reproducing signal RF is converted into binary data. Then, the clock component and the pulse length are outputted to a spindle control circuit 13 installed in an LSI 12. The spindle control circuit 13 generates a rotation control signal to be supplied to the spindle motor 6 on the basis of the clock component and the pulse length, and outputs the rotation control signal to the spindle motor 6 through a driver 17 in order to rotate the optical disc 1 at the constant liner velocity. Thus, a rotation servo control is performed.

Moreover, the pre-amp 8 amplifies a tracking error signal TE and a focus error signal FE generated by the pickup 2 respectively, and outputs these signals to a tracking equalizer 14 and a focus equalizer 15 installed in the LSI 12 respectively.

The tracking equalizer 14 performs a phase compensation on the basis of the tracking signal TE. The tracking control circuit 16 performs a gain adjustment on the basis of the result of the phase compensation, and outputs a driving signal to an actuator installed in the pickup 2 through the driver 17. Thus, a tracking servo control is performed.

The focus equalizer 15 performs a phase compensation on the basis of the focus error signal FE, and outputs a driving signal to an actuator installed in the pickup 2 through the driver 17. Thus, a focus servo control is performed.

The aforementioned rotation servo control, the tracking servo control and the focus servo control are respectively controlled by a micro computer 18, and calculations necessary for these control are performed in the micro computer 18.

Accordingly, in the CD reproducing apparatus 100 shown in FIG. 1, the reproducing operation is preferably carried out.

Furthermore, the CD reproducing apparatus 100 needs to carry out not only the reproducing operation but also a accurate and quick seeking operation. The seeking operation is an operation to move the carriage 3 to a target position.

In the embodiment, in order to carry out the seeking operation, the driving control of the stepping motor 4 is performed by the micro computer 18. Namely, the micro computer 18 outputs a driving signal to the stepping motor 4 through the driver 17, and controls the driving of the stepping motor 4 in order to move the carriage 3 by the stepping motor 4.

Furthermore, in the seeking operation, a positioning control is performed in order to move the carriage to a target position accurately. In the embodiment, a trapezoidal shape driving method is used for the positioning control. According to the trapezoidal shape driving method, acceleration and deceleration are rectilinearly performed, and a constant velocity period is set between an accelerating period and a decelerating period. The acceleration and the deceleration is realized by changing response frequency, i.e., an interval of a pulse signal to be used for exciting the stepping motor 4. The constant velocity driving is realized by making the response frequency constant.

The number of steps necessary for each of the acceleration, the deceleration and the constant velocity driving is obtained by dividing the total number of steps from the present position (first position) and the target position (second position) into three equal parts. The total number of steps is obtained by dividing a distance between the present position and the target position by a distance of movement corresponding to 1 step (pulse) in a microstep method (for instance, 11.1875 [μm]). In the embodiment, as 8 steps (pulses) in the microstep method corresponds to 1 step (pulse) in the one-two-phase excitation method, if the obtained total number of steps is divided by 8, the number of the steps in the one-two-phase excitation can be calculated. In the following explanation, "the number of steps" means the number of steps in the one-two-phase excitation.

Figure 2A:
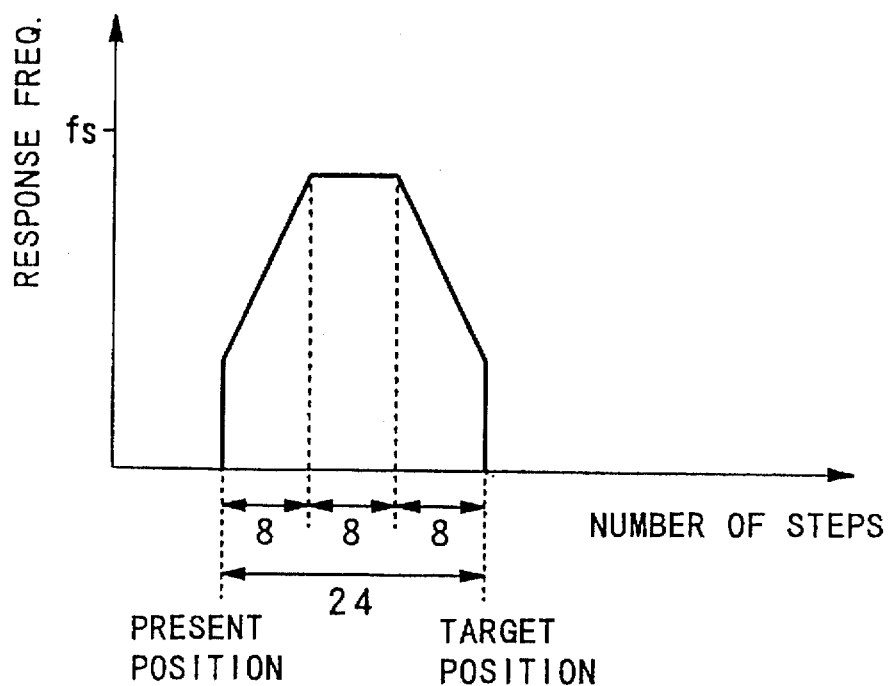
FIG. 2A to 2C are graphs each showing a relationship between the number of steps and response frequency in the first embodiment of the present invention.

For example, as shown in FIG. 2A, in case that the total number of steps from the present position to the target position is 24 steps, by dividing this into three equal parts, each of the steps necessary for the acceleration, the deceleration, and the constant velocity driving is 8 steps.

Figure 2B:
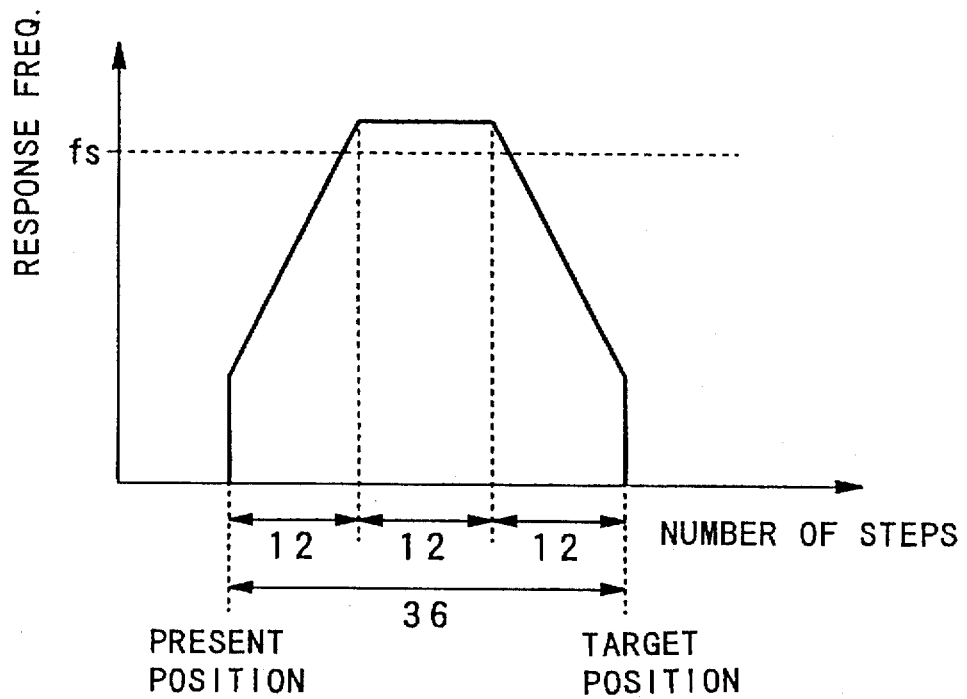

Moreover, as shown in FIG. 2B, in case that the total number of steps is 36 steps, by dividing this into three equal parts, each of the steps necessary for the acceleration, the deceleration, and the constant velocity driving is 12 steps.

Figure 2C:
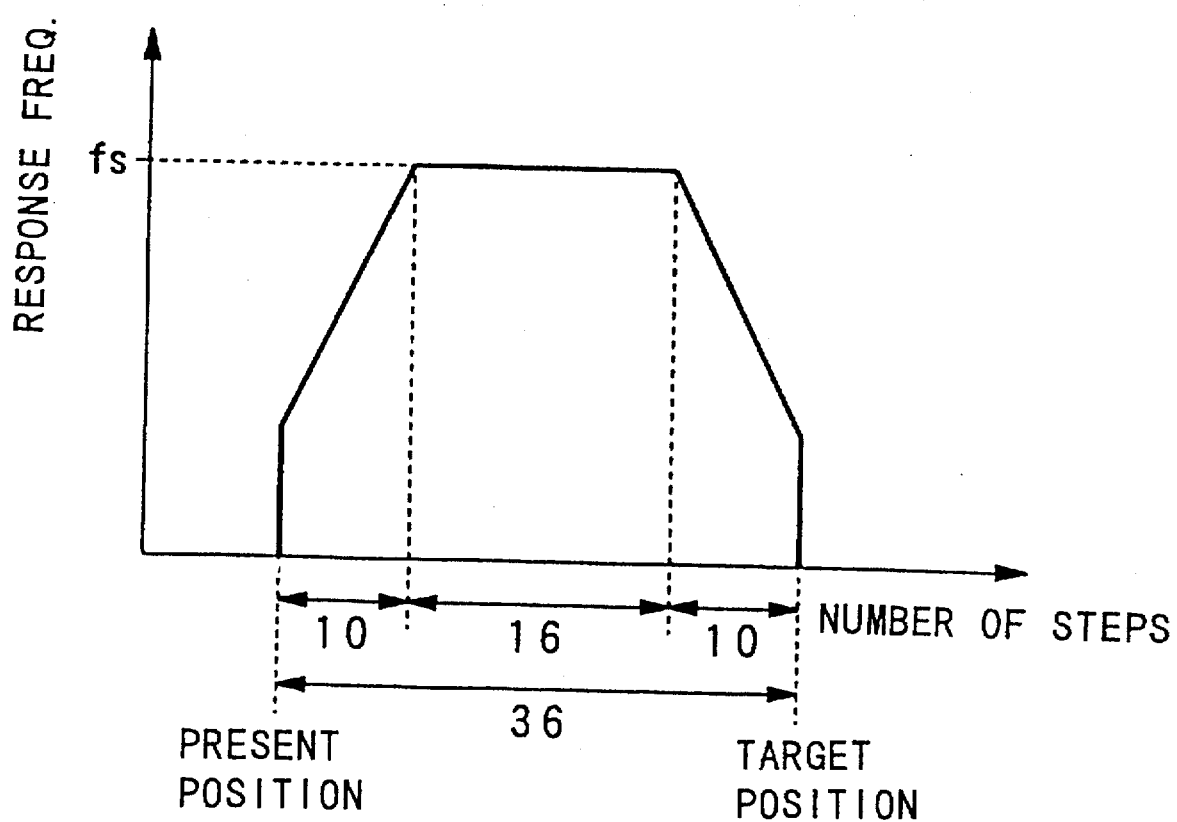

Here, in another apparatus using only the one-two-phase excitation method for driving a stepping motor, it is impossible that the response frequency exceeds the maximum response frequency when the acceleration is performed. Therefore, in case that the number of steps required to increase the response frequency to the maximum response frequency is 10 steps, it is impossible that the number of steps for the acceleration exceeds 10 steps. For this reason, if the number of steps for the acceleration is 12 steps, 10 steps is set to the number of steps for the acceleration. In this case, as the number of steps for the deceleration is equal to that for the acceleration, 10 steps is also set to the number of steps for the deceleration. As a result, the number of steps for acceleration is 10 steps, the number of steps for deceleration is 10 steps, the number of steps for the constant velocity driving is 16 steps, as shown in FIG. 2C.

Accordingly, in the apparatus using only the one-two-phase excitation method for driving the stepping motor, the maximum response frequency is limited to such a low value. Therefore, as shown in FIG. 2C, in case that a distance necessary for seeking is long, it is impossible to make the maximum velocity of the stepping motor sufficiently high.

In contrast, the CD reproducing apparatus 100 of the embodiment of the present invention uses the one-two-phase excitation method and two-phase excitation method for driving the stepping motor 4. Namely, the CD reproducing apparatus 100 controls the stepping motor 4 by using two types of operations in order to move the carriage 3 from a present position to a target position. The first type operation uses only the one-two-phase excitation method. The second type operation uses both of the o one-two-phase excitation method and the two-phase excitation method by changing over these excitation method.

Here, in case that the two-phase excitation method is used for driving the stepping motor 4, as a fluctuation of torque is small, it i s possible to make the maximum response frequency high. However, in case of the two-phase excitation method, as the range of movement corresponding to one pulse is large, a large disturbance arises in an actuator for holding an objective of the optical pickup 2. Since vibration of the actuator is relatively large until velocity of the stepping motor 4 reaches a predetermined velocity from the starting of the acceleration, it is necessary to reduce the disturbance during this period.

For such a reason, in the CD reproducing apparatus 100 of the embodiment, if the number of steps necessary for the acceleration, which is obtained by dividing the total number of steps into three equal parts, exceeds the number of step required to increase the response frequency to the maximum response frequency fs of the one-two-phase excitation, the stepping motor 4 is driven by the one-two-phase excitation until the response frequency reaches the maximum response frequency fs from the starting of the acceleration, and then, when the response frequency exceeds the maximum response frequency fs, the excitation method is changed over from the one-two-phase excitation to the two-phase excitation, and the stepping motor 4 is next driven by the two-phase excitation.

On the other hand, if the number of steps necessary for the acceleration does not exceed the number of step required to increase the response frequency to the maximum response frequency fs, the stepping motor 4 is driven by only the one-two-phase excitation for all periods, i.e., the acceleration period, the deceleration period and the constant velocity period.

Accordingly, since the excitation method is changed over, it is possible to restrict the disturbance which affects the actuator to a low level until the response frequency reached the maximum response frequency fs, and it is possible to make the response frequency higher than the maximum frequency fs of the one-two-phase excitation, in case of a long seeking distance. Thus, it is possible to reduce a time necessary for the seeking with keeping stability of the stepping motor 4.

Here, when the excitation method is changed over from the one-two-phase excitation to the two-phase excitation, it is necessary that the rotor position of the stepping motor 4 is set at the two-phase excitation position. Therefore, before the acceleration is performed, the position of the rotor is adjusted by the microstep method so as to set it at the one-phase excitation position or the two-phase excitation position in accordance with the necessary number of steps between the position of starting the acceleration and the position to change over the excitation method.

In the embodiment, the position to change over the excitation method is the position where the response frequency reaches the maximum response frequency fs of the one-two-phase excitation. Further, the number of steps required to increase the response frequency to the maximum response frequency fs is 10 steps. Therefore, the position of the rotor is adjusted by the microstep method so as to set it to the two-phase excitation position, before the acceleration is performed.

Next, a process of controlling the stepping motor 4 is explained with reference to FIGS. 3, 4, 5A, 5B and 5C, In addition, the process is carried out by the micro computer 18. The present position is always managed by the micro computer 18 as address information. The target position is inputted from the external into the micro computer 18 through an external input device (not shown in figures), as address information. An instruction to start the seeking operation is also inputted from the external into the micro computer 18 through an external input device.

Figure 4:
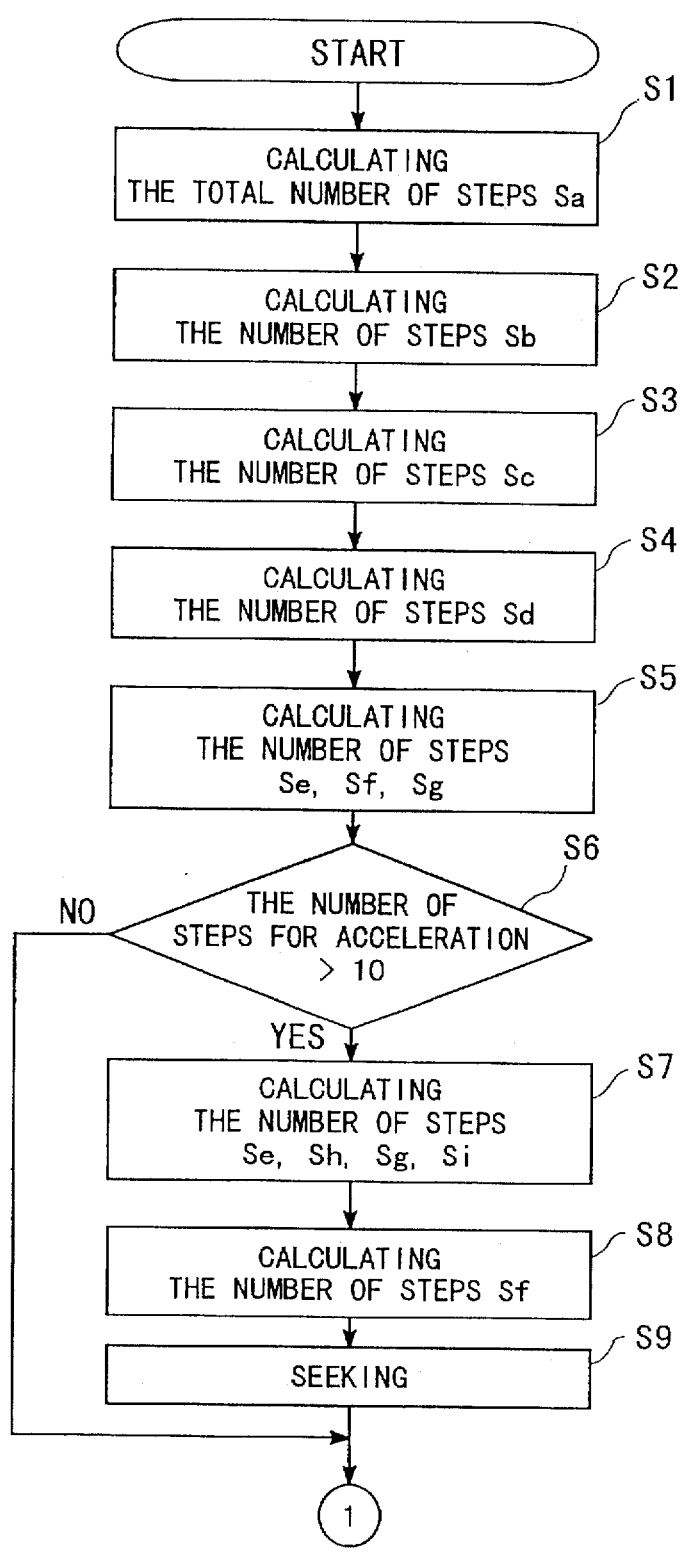
FIG. 4 is a flowchart showing a process of calculating the number of steps in the first embodiment of the present invention.

As shown in FIG. 4, when the target position and the instruction to start the seeking operation are inputted, the number of steps necessary for each of the adjustment, the acceleration, the constant velocity driving, the deceleration and the landing is calculated. At first, the total number of steps Sa from the present address to the target address is calculated (Step 1). At this time, as mentioned above, 1 step in the microstep method is used as the unit of counting the total number of steps.

Next, the number of steps necessary for the adjustment of the rotor position is calculated. As mentioned above, since it is necessary that the rotor position is just positioned at the two-phase excitation position when the response frequency just reaches the maximum response frequency fs, it is necessary that the position of starting the acceleration is the two-phase excitation position. Therefore, the number of steps Sb corresponding to a distance from the present position to the two-phase excitation position closest to the present position is calculated (Step 2).

Next, as the number of steps Sc necessary for the landing is retained in a memory in advance, this value is read from the memory (Step 3).

Next, the number of steps Sd necessary for the acceleration, the constant velocity driving and the deceleration is calculated by a following expression (Step 4).

$$d=(a-(b+c))/8$$

In addition, in the embodiment, 1 step in the one-two-phase excitation method corresponds to 8 steps in the microstep method.

Next, by dividing the total number of steps Sd by three, the number of steps Se necessary for the acceleration, the number of steps Sf necessary for the constant velocity driving, and the number of steps Sg necessary for the deceleration are obtained respectively (Step 5).

Next, it is determined whether or not the number of steps Se for acceleration exceeds the number of steps required to increase the response frequency to the maximum response frequency, i.e., 10 steps (Step 6). If the number of steps Se does not exceed 10 steps (Step 6; NO), the seeking starts (Step 9), and the process proceeds to the next step shown in FIG. 5 in order to drive the stepping motor 4 by using only the one-two-phase excitation.

On the other hand, the number of steps Se for acceleration exceeds 10 steps (Step 6; YES), the number of steps Sh necessary for the acceleration by the two-phase excitation is calculated in order to change over the excitation method and drive the stepping motor 4 by the two-phase excitation from the 11th step. Namely, at first, 10 is subtracted from the number of steps Se, next, the result of subtraction is divided by 2, and the result of dividing is set to the number of steps Sh. In addition, by dividing the number of steps in the one-two-phase excitation by 2, the number of the steps in the one-two-phase excitation method can be changed into that in the two-phase excitation method.

After 10 steps is set as the number of steps Se for acceleration by the one-two-phase excitation and the number of steps Sh for acceleration by the two phase excitation is calculated, 10 steps is set as the number of steps Sg for deceleration by the one-two-phase excitation and the number of steps Si for deceleration by the two phase excitation is calculated (Step 7). In addition, the number of steps Si is equal to the number of steps Sh.

Next, the number of steps Sf for the constant velocity driving by the two-phase excitation is calculated (Step 8). Namely, the number of steps Sf is afresh calculated by dividing the number of steps Sf calculated in the step 5 by 2. In addition, in the embodiment, the acceleration is performed in the constant acceleration. Therefore, if the number of steps Se exceeds 10 steps in the step 6, the constant velocity is calculated on the basis of the number of steps Se and the initial velocity. On the other hand, if the number of steps Se does not exceed 10 steps in the step 6, the constant velocity is calculated on the basis of the total of the number of steps Se set in the step 7 and the number of steps Sh and an initial velocity.

Figure 5A:
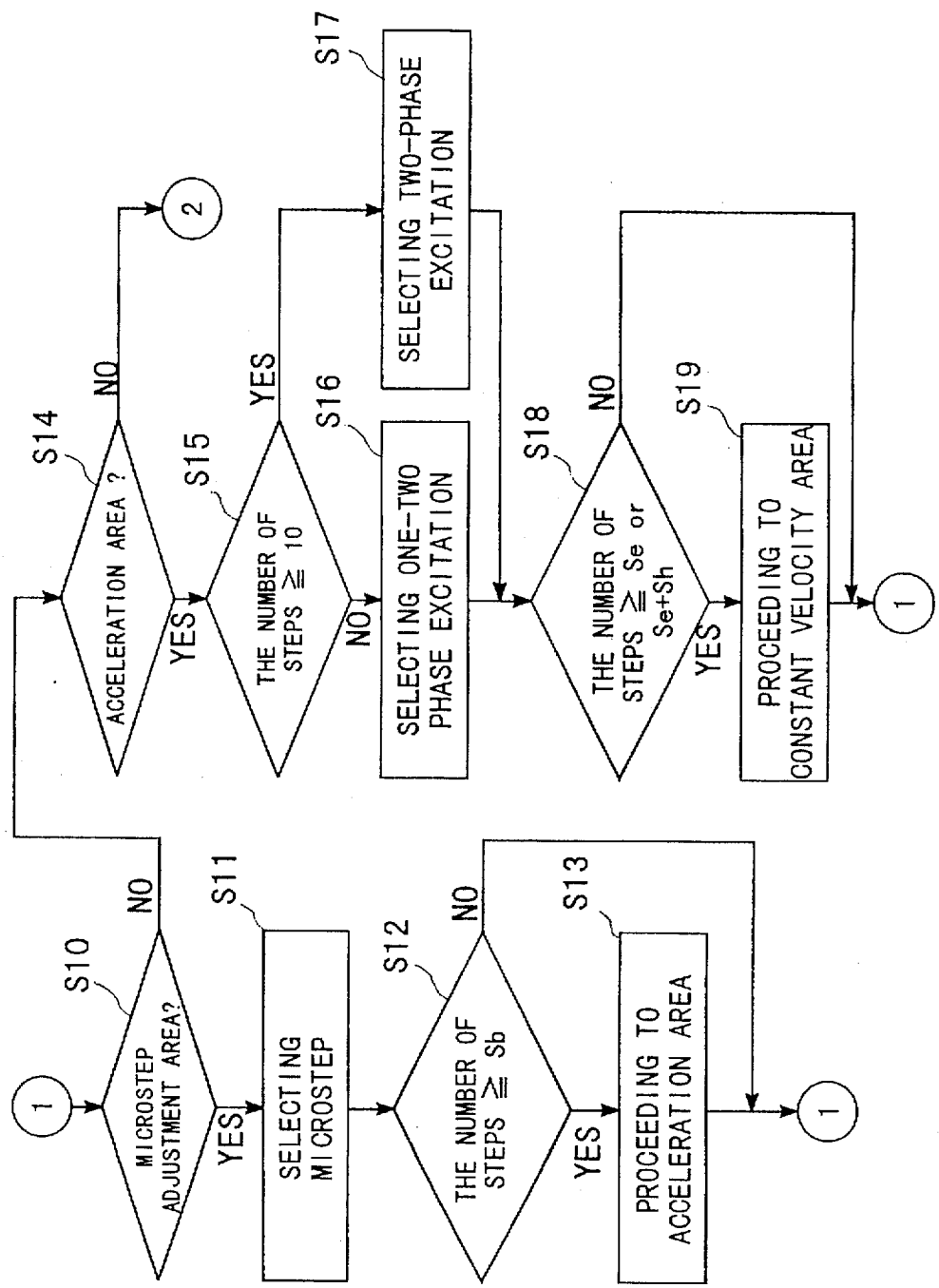
FIG. 5A to 5C are flowcharts showing a seeking operation process in the first embodiment of the present invention.

After the numbers of steps Se, Sh, Sg and Si are set, the seeking starts (Step 9), and the process proceeds to the next step shown in FIG. 5A.

Figure 3:
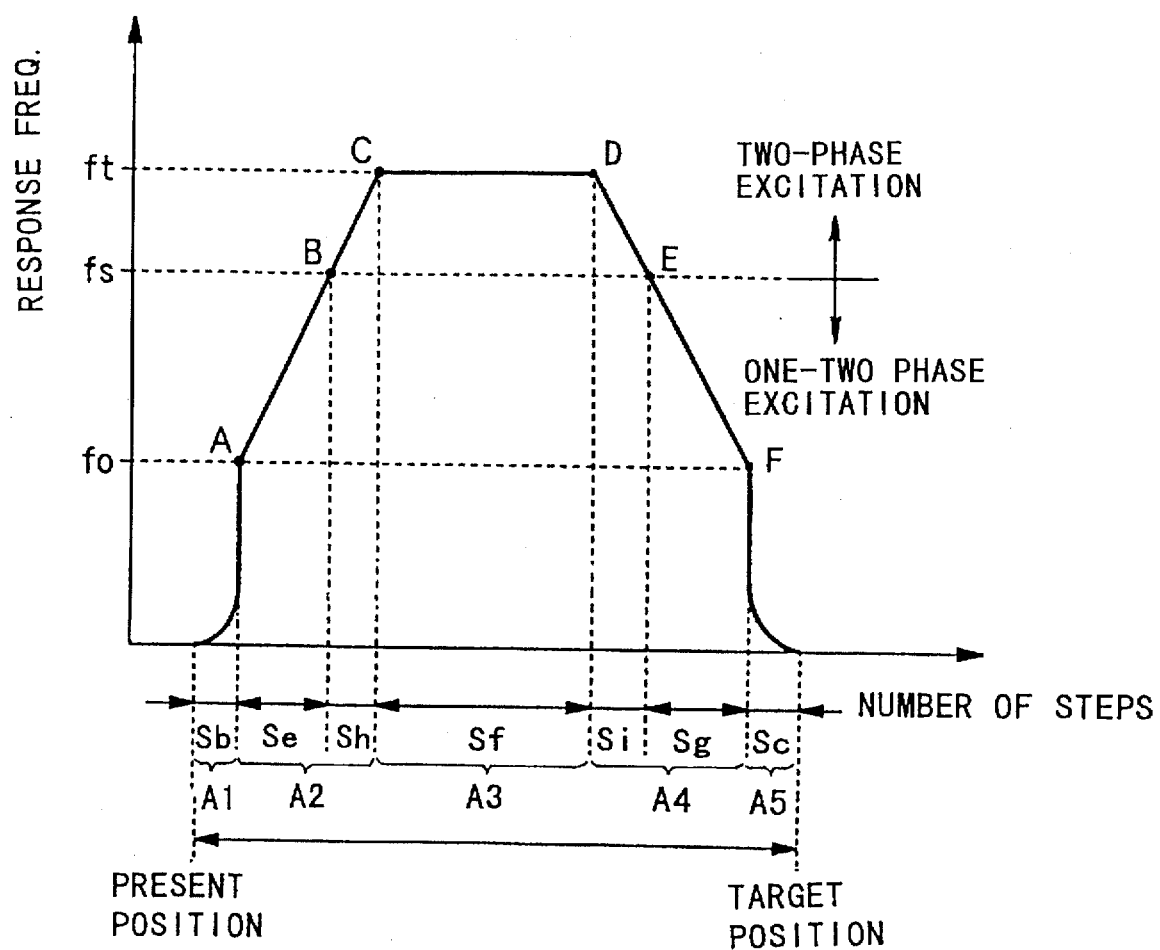
FIG. 3 is a graph showing a relationship between the number of steps and response frequency in the first embodiment of the present invention.

Next, the seeking operation process is explained. As shown in FIG. 3, in the seeking operation from the present position to the target position is divided into 5 areas, i.e., a microstep adjustment area A1, an acceleration area A2, a constant velocity area A3, a deceleration area A4, and a landing area A5, and the seeking operation is performed in this order.

At first, as shown in FIG. 5A, in the microstep adjustment area A1 (Step 10; YES), the stepping motor 4 is driven by the microstep method until the number of steps reaches the number of steps Sb (Step 11). As a result, the position of the rotor of the stepping motor 4 is moved to the two-phase excitation position closest to the present position. When the number of steps reaches the number of steps Sb (Step 12; YES), the process proceeds to the acceleration area A2 (Step 13).

Next, in the acceleration area A2 (Step 14; YES), the stepping motor 4 is driven according to the predetermined acceleration. Furthermore, in this area, if the number of steps Se has not exceeds 10 steps (Step 6; NO), the stepping motor 4 is driven by only the one-two-phase excitation until the number of steps reaches the number of steps Se. Namely, the step 14, step 15, step 16 and step 18 shown in FIG. 5A are repeatedly carried out in this order, and when the number of steps reaches the number of steps Se (Step 18; YES), the process proceeds to the constant velocity area A3 (Step 19).

On the other hand, in the acceleration area A2, if the number of steps Se has exceeded 10 steps (Step 6; YES), the stepping motor 4 is driven by the one-two-phase excitation and the two-phase excitation until the number of steps reaches the number of steps "Se+Sh". Namely, at first, the stepping motor 4 is driven by the one-two-phase excitation until the number of steps reaches the number of steps Se, i.e., 10 steps (Step 15; NO and Step 16). When the number of steps reaches 10 steps (Step 15; YES), the excitation method is changed over from the one-two-phase excitation to the two-phase excitation. Next, the stepping motor 4 is driven by the two-phase excitation until the number of the steps reaches the number of steps Sh (Step 17). When the number of steps reaches the number of steps Sh (Step 18; YES), the process proceeds to the constant velocity area A3 (Step 19). In this manner, as shown in FIG. 3, the stepping motor 4 is driven by the one-two-phase excitation from the point A to the point B, and driven by the two-phase excitation from the point B to the point C.

Figure 5B:
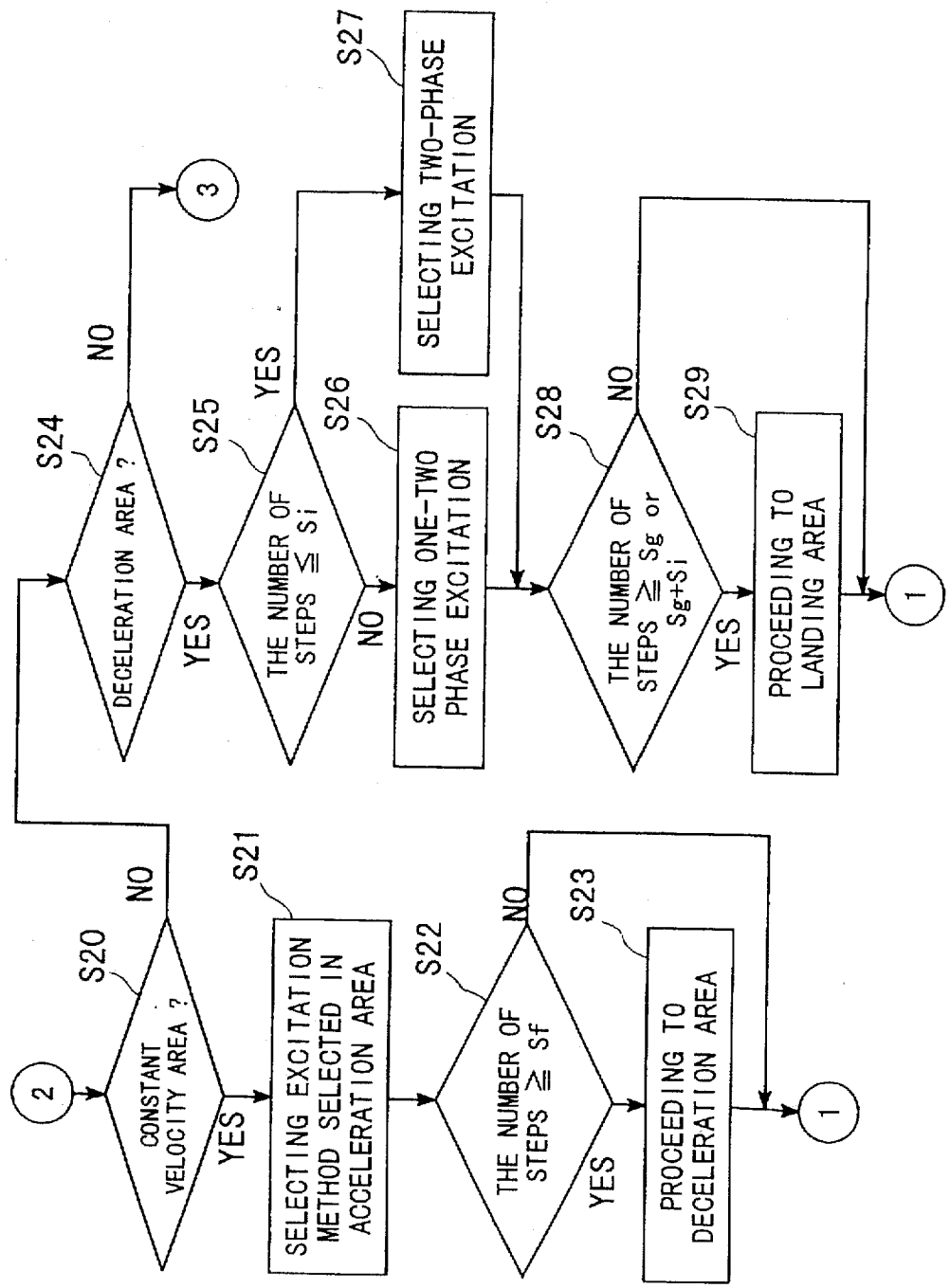

Next, as shown in FIG. 5B, in the constant velocity area A3 (Step 20; YES), at first, the excitation method that has been selected at the end of the acceleration area A2 is selected (Step 21), and the stepping motor 4 is driven by the selected excitation method until the number of steps reaches the number of steps Sf. Furthermore, in this area A4, the stepping motor 4 is rotated in the constant velocity. The maximum velocity in the acceleration area A3 is set to the velocity used in this area A4. When the number of steps reaches the number of steps Sf, the process proceeds to the deceleration area A5 (Step 23).

Next, in the deceleration area A4 (Step 24; YES), if the stepping motor 4 has been driven by the one-two-phase excitation in the constant velocity area A4, it is continuously driven by the same excitation until the number of steps reaches the number of steps Sg (Step 25; NO and Step 26). When the number of steps reaches the number of steps Sg, the process proceeds to the landing area A6 (Step 29).

On the other hand, if the stepping motor 4 has been driven by the two-phase excitation in the constant velocity area A4, the stepping motor 4 is driven by the one-two-phase excitation and the two-phase excitation until the number of steps reaches the number of steps "Si+Sg". Namely, at first, the stepping motor 4 is driven by the two-phase excitation until the number of steps reaches the number of steps Si (Step 25; YES and Step 27). When the number of steps reaches the number of steps Si (Step 25; NO), the excitation method is changed over from the two-phase excitation method to the one-two-phase excitation method. Accordingly, the stepping motor 4 is next driven by the one-two-phase excitation until the number of steps reaches the number of steps Sg (Step 26). When the number of steps reaches the number of steps Sg (Step 28; YES), the process proceeds to the landing area A5 (Step 29). In this manner, as shown in FIG. 3, the stepping motor 4 is driven by the two-phase excitation from the point D to the point E, and driven by the one-two-phase excitation from the point E to the point F.

Figure 5C:
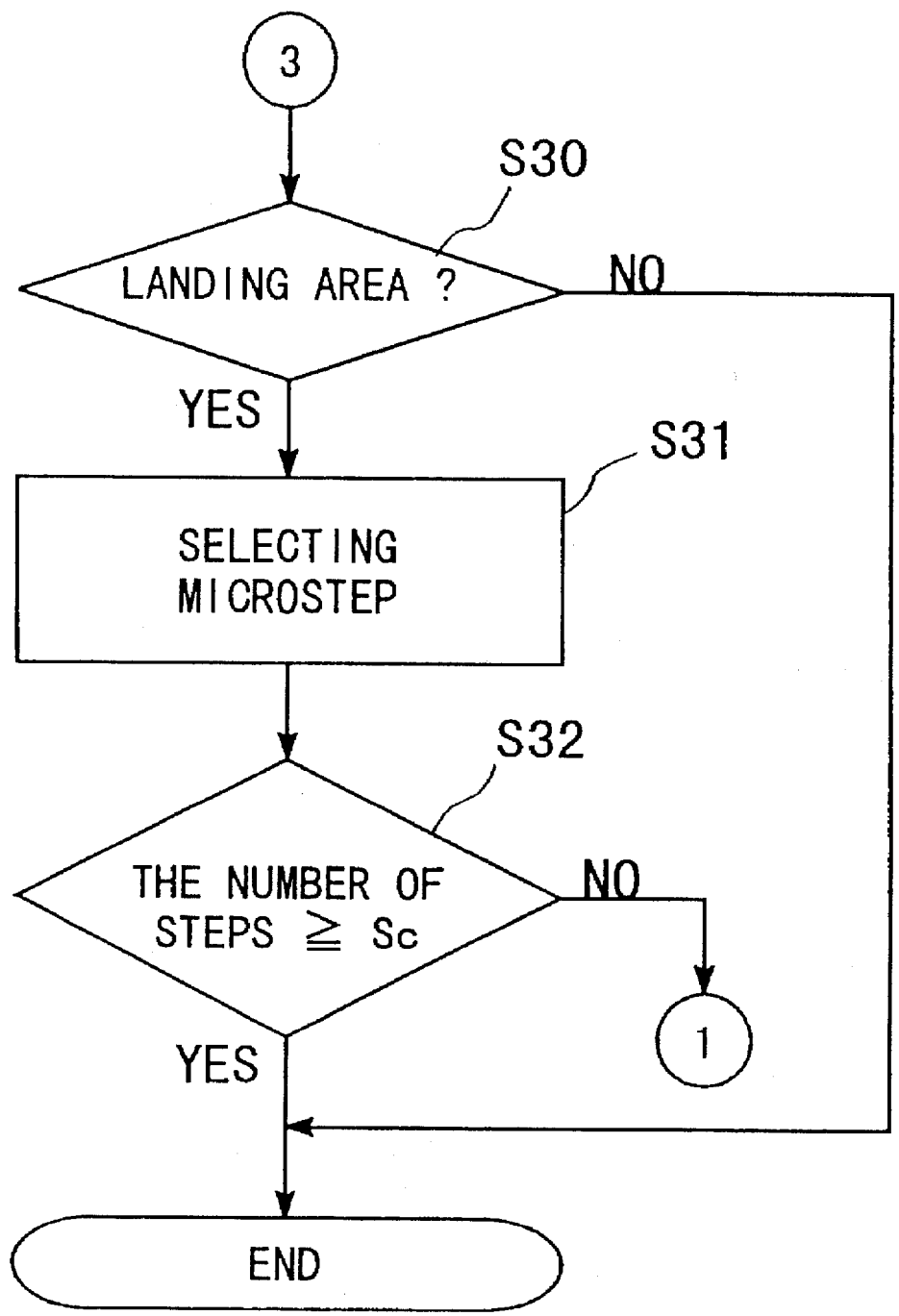
Figure 6:
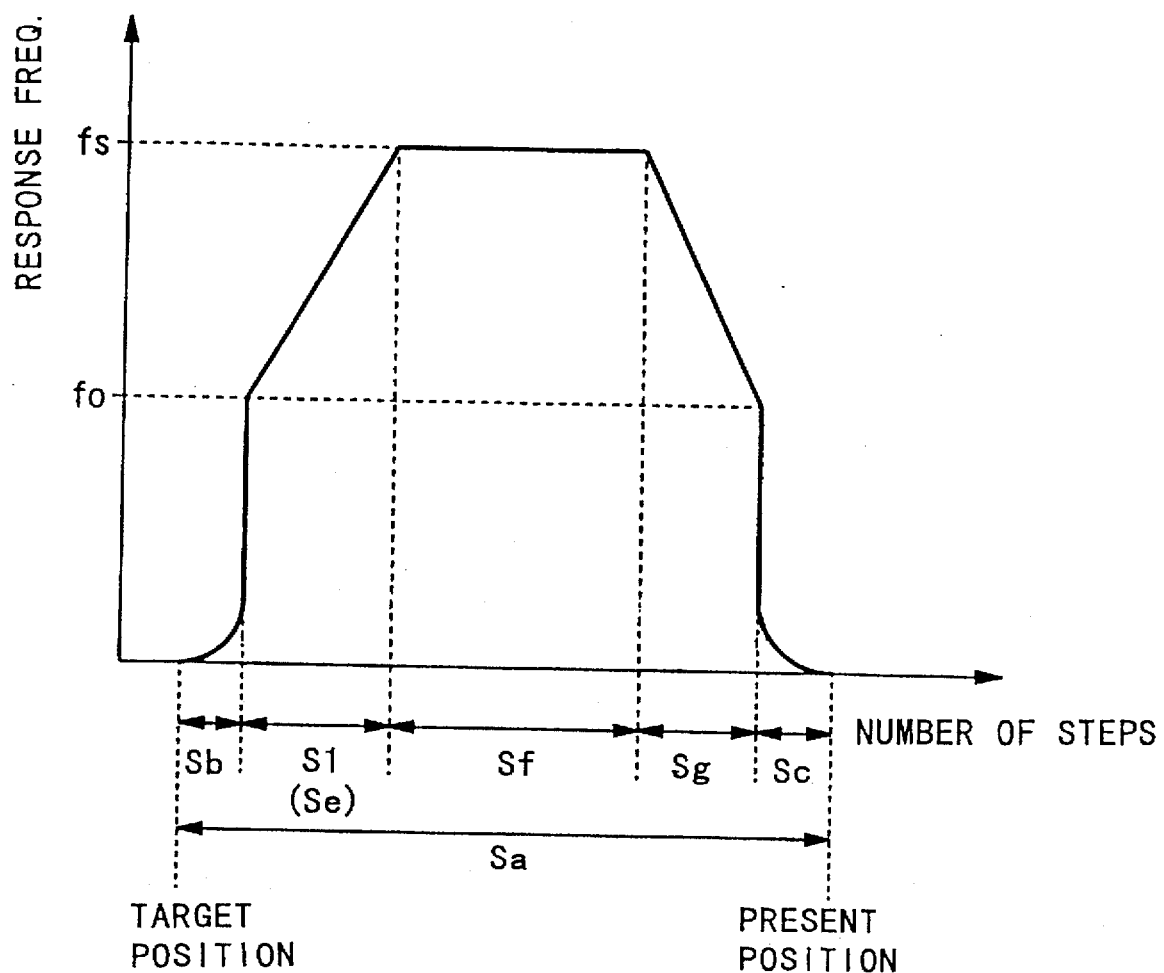
FIG. 6 is a graph showing a relationship between the number of steps and response frequency.

Next, as shown in FIG. 5C, in the landing area A5 (Step 30), the stepping motor 4 is driven by the microstep method until the number of steps reaches the number of steps Sc (Step 31), and the landing is carried out. When the number of steps reaches the number of steps Sc, the process ends.

Thus, if a seeking distance is relatively short, and therefore, the number of steps Se necessary for the acceleration is smaller than the number of steps required to increase the response frequency to the maximum response frequency fs of the one-two-phase excitation, the stepping motor is always driven by the one-two-phase excitation in the acceleration area A2, the constant velocity area A3 and the deceleration area A4. Thus, it is possible to move the carriage 3 to the target position quickly and accurately. On the other hand, if a seeking distance is relatively long, and therefore, the number of steps Se is greater than the number of steps required to increase the response frequency to the maximum response frequency fs, the stepping motor 4 is driven by the one-two-phase excitation at first, and next, the excitation method is changed over from the one-two-phase excitation to the two-phase excitation, and the stepping motor 4 is next driven by the two-phase excitation, in the acceleration area A2. Furthermore, in the deceleration area A4, the stepping motor 4 is driven by the two-phase excitation at first, and next, the excitation method is changed over from the two-phase excitation to the one-two-phase excitation, and the stepping motor 4 is next driven by the one-two-phase excitation. Thus, as shown in FIG. 3, it is possible to accelerate the stepping motor 4 to the response frequency ft which exceeds the maximum response frequency fs. Accordingly, it is possible to make the maximum velocity of the stepping motor 4 higher and to make the seeking time shorter, with keeping stability of the stepping motor 4.

In addition, as mentioned above, in case that the number of steps Se exceeds the number of steps required to increase the response frequency to the maximum response frequency fs, the excitation method is changed over from the one-two-phase excitation to the two-phase excitation. When the one-two-phase excitation is changed into the two-phase excitation, the number of steps in the one-two-phase excitation needs to be divided by 2. At this time, if the number of steps is an odd number, it cannot be divided by 2. In such a case, it is necessary to change the position to change over the excitation method or it is necessary to adjust the velocity in the constant velocity area A3.

For instance, in a case that the number of the steps required to increase the response frequency to the maximum response frequency fs is 10 steps and the total number of steps between the present position and the target position is 39 steps, the number of steps necessary for the acceleration is 13 steps. Similarly, the number of steps necessary for the constant velocity driving is 13 steps, and the number of steps necessary for the deceleration is also 13 steps. In this case, if 10 steps is subtracted from 13 steps, 3 steps is obtained. But, 3 steps cannot be divided by 2. In this case, 10 steps is changed into 9 steps, 9 steps is used as the number of the steps to change over the excitation method. As a result, when 9 steps is subtracted from 13 steps, 4 steps can be obtained, and can be divided by 2. Moreover, in the case that the number of steps necessary for the constant velocity driving is 13 steps in the one-two-phase excitation, it is impossible to convert 13 steps in the one-two-phase excitation into the exactly corresponding number of steps in the two-phase excitation. In this case, the velocity in the constant velocity area A3 is adjusted so as to move the carriage 3 by the distance corresponding to 13 steps.

In addition, in the case that the position to change over the excitation method is changed, the rotor position at the beginning of the acceleration by using the one-two-phase excitation is adjusted by the microstep method such that the rotor position at the beginning of the acceleration by using the two-phase excitation can be set at the two-phase excitation position.

Furthermore, in the embodiment, the trapezoidal shape driving method is used for the positioning control method. The present invention is not limited to this. For instance, a triangle shape driving method, which has only the acceleration period and the deceleration period, can be used.

Moreover, in the embodiment, if the number of the steps Se for the acceleration exceeds the number of steps required to increase the response frequency to the maximum response frequency, the excitation method is changed over. The present invention is not limited to this. Namely, another position preferable to restricting the disturbance affecting the actuator installed in the pickup 2 may be set to the position to change over the excitation method.

(Second Embodiment)

Next, a second embodiment of the present invention will be explained. As a hardware configuration of a CD reproducing apparatus of the second embodiment is the same as that of the CD reproducing apparatus 100 of the first embodiment, an explanation thereof is omitted.

Compared with the CD reproducing apparatus 100 of the first embodiment, different parts of the CD reproducing apparatus of the second embodiment is that the total distance between the present position and the target position and the distance necessary for each of the acceleration, the constant velocity driving, and the deceleration are calculated on the basis of the number of tracks on the optical disc.

Here, the seeking operation of the second embodiment is explained. In seeking operation, the tracking servo is opened, and the objective installed in the pickup is moved by supplying the driving signal to the actuator installed in the pickup, so that the tracking error signal can be obtained. Then, the number of tracks on the optical disc is counted by using this tracking error signal, and the stepping motor is driven on the basis of the number of tracks.

More specifically, at first, the distance between the present position and the target position is calculated, and the total number of tracks for seeking is calculated by dividing this distance by a track pitch.

Next, a velocity curve shaped like a trapezoid shown in FIG. 3 is calculated on the basis of the total number of tracks for seeking, an initial velocity, a maximum velocity, and an acceleration to be used for accelerating.

Next, the driving signal is supplied to the actuator of the pickup 2, the objective is moved in accordance with the velocity curve. At this time, the number of tracks is counted.

As a result, the objective crosses the tracks. When the number of tracks that the objective has crossed reaches the tracks corresponding to 1 pulse of the stepping motor 4 (for instance, 7 steps in case of the microstep), the stepping motor is moved by 1 pulse.

This operation is repeated in accordance with the velocity curve in order to drive the stepping motor. In addition, in order to increase the acceleration of the objective, a voltage of the driving signal to be supplied to the actuator is gradually increased, and thereby, the responsiveness of the objective is gradually increased.

Moreover, in this method, the position to change over the excitation method from the one-two-phase excitation to the two-phase excitation or from the two-phase excitation to the one-two-phase excitation is determined on the basis of velocity of the objective. On the other hand, this position may be determined by counting the number of tracks.

According to the CD reproducing apparatus of the second embodiment, as the stepping motor is controlled on the basis of the number of tracks, it is possible to make the positioning control more accurate.

(Third Embodiment)

Next, a third embodiment of the present invention will be explained. As a hardware configuration of a CD reproducing apparatus of the third embodiment is the same as that of the CD reproducing apparatus 100 of the first embodiment, an explanation thereof is omitted.

The CD reproducing apparatus of the third embodiment performs the seeking operation by using both of a pulse method wherein the seeking operation is performed on the basis of the number of steps as explained in the first embodiment and a track counting method wherein the seeking operation is performed on the basis of the number of the tracks as explained in the second embodiment.

Here, the seeking operation of the third embodiment is explained. At first, both of the total number of tracks and the total number of steps for seeking are calculated. At the same time, counting the number of tracks is stated. Next, the seeking operation by using the pulse method is started, and then, the stepping motor 4 is driven on the basis of the pules (steps) in a microstep adjustment area A1, a acceleration area A2 and a constant velocity area A3 (see FIG. 3).

Next, in the constant velocity area A3, the stepping motor 4 is driven in the constant velocity until the number of tracks reaches the number of tracks to start the deceleration, and when the number of tracks reached the number of tracks to start the deceleration, the control by using the track count method is started.

Namely, the objective is driven in accordance with the constant deceleration, and when the number of tracks that the objective has crossed reaches the number of tracks corresponding to 1 pulse of the stepping motor 4, the stepping motor 4 is moved by 1 pulse. This operation is performed during a deceleration area A4 and a landing area A5. In the deceleration area A4, the position to change over the excitation method is determined on the basis of velocity of the objective or the number of tracks. Moreover, the number of tracks to start the deceleration is determined on the basis of a velocity curve calculated in advance.

According to the CD reproducing apparatus of the third embodiment, as the stepping motor is controlled on the basis of the pulse method from the start of the seeking to the constant velocity driving, it is possible to make the seeking operation simple, and as the stepping motor is controlled on the basis of the track counting method during the deceleration and the landing, it is possible to make the seeking operation accurate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for controlling a stepping motor used for moving a movable body from a first position to a second position, the apparatus comprising:
   a calculating device for calculating a moving distance between the first position and the second position;
   a setting device for setting an acceleration area to accelerate the stepping motor and a deceleration area to decelerate the stepping motor, on the basis of the moving distance; and
   a driving device for driving the stepping motor by a one-two-phase excitation method until rotation velocity of the stepping motor increases to a predetermined velocity in the acceleration area, driving the stepping motor by a two-phase excitation method after rotation velocity of the stepping motor increases to the predetermined velocity in the acceleration area, driving the stepping motor by the two-phase excitation method until rotation velocity of the stepping motor decreases to the predetermined velocity in the deceleration area, and driving the stepping motor by the one-two-phase excitation method after rotation velocity of the stepping motor decreases to the predetermined velocity in the deceleration area.

2. An apparatus according to claim 1, wherein the predetermined velocity is a maximum rotation velocity of the stepping motor in case that the stepping motor is driven by the one-two-phase excitation method.

3. An apparatus for controlling a stepping motor used for moving a movable body from a first position to a second position, the apparatus comprising:
   a calculating device for calculating the total number of steps between the first position and the second position;
   a setting device for setting an acceleration area to accelerate the stepping motor and a deceleration area to decelerate the stepping motor, on the basis of the total number of steps; and
   a driving device for driving the stepping motor by a one-two-phase excitation method until the number of steps reaches a first predetermined number in the acceleration area, driving the stepping motor by a two-phase excitation method after the number of steps reaches the first predetermined number in the acceleration area, driving the stepping motor by the two-phase excitation method until the number of steps reaches a second predetermined number in the deceleration area, and driving the stepping motor by the one-two-phase excitation method after the number of steps reaches the second predetermined number in the deceleration area.

4. An apparatus according to claim 3, wherein
   the first predetermined number is the number of steps required that rotation velocity of the stepping motor increases to a predetermined velocity in the acceleration area,
   the second predetermined number is the number of steps required that rotation velocity of the stepping motor decreases to the predetermined velocity in the deceleration area, and
   the predetermined velocity is a maximum rotation velocity of the stepping motor in case that the stepping motor is driven by the one-two-phase excitation method.

5. An apparatus according to claim 3 further comprising:
   an excitation position selecting device for selecting either one of a one-phase excitation position and a two-phase excitation position as an excitation position at a beginning of the acceleration area, on the basis of the first predetermined number; and
   a rotor position adjusting device for moving a rotor of the stepping motor to the selected excitation position by using a microstep method before acceleration of the stepping motor starts.

6. An apparatus for controlling a stepping motor used for moving a movable body from a first position to a second position, the apparatus comprising:
   a total number calculating device for calculating the total number of steps between the first position and the second position;
   a setting device for setting an acceleration area to accelerate the stepping motor and a deceleration area to decelerate the stepping motor, on the basis of the total number of steps;
   a step number calculating device for calculating the number of steps necessary for accelerating the stepping motor during the acceleration area;
   a driving pattern selecting device for selecting a first driving pattern wherein the stepping motor is driven by only a one-two-phase excitation method during the acceleration area and during the deceleration area, if the calculated number of steps necessary for accelerating is less than a first predetermined number, and selecting a second driving pattern wherein the stepping motor is driven by the one-two-phase excitation method until the number of steps reaches the first predetermined number in the acceleration area, driven by a two-phase excitation method after the number of steps reaches the first predetermined velocity in the acceleration area, driven by the two-phase excitation method until the number of steps reaches a second predetermined number in the deceleration area, and driven by the one-two-phase excitation method after the number of steps reaches the second predetermined number in the deceleration area, if the calculated number of steps necessary for accelerating is not less than the first predetermined number; and a driving device for driving the stepping motor by the selected driving pattern.

7. An apparatus according to claim 6, wherein the first predetermined number is the number of steps required that rotation velocity of the stepping motor increases to a predetermined velocity in the acceleration area, the second predetermined number is the number of steps required that rotation velocity of the stepping motor decreases to the predetermined velocity in the deceleration area, and the predetermined velocity is a maximum rotation velocity of the stepping motor in case that the stepping motor is driven by the one-two-phase excitation method.

8. An apparatus for controlling a stepping motor used for moving a carriage from a first position to a second position, the carriage having a pickup to read information from a disc on which a plurality of tracks are formed, the apparatus comprising:

a calculating device for calculating the total number of tracks between the first position and the second position;

a setting device for setting an acceleration area to accelerate the stepping motor and a deceleration area to decelerate the stepping motor, on the basis of the total number of tracks; and a driving device for driving the stepping motor by a one-two-phase excitation method until the number of tracks reaches a first predetermined number in the acceleration area, driving the stepping motor by a two-phase excitation method after the number of tracks reaches the first predetermined number in the acceleration area, driving the stepping motor by the two-phase excitation method until the number of tracks reaches a second predetermined number in the deceleration area, and driving the stepping motor by the one-two-phase excitation method after the number of tracks reaches the second predetermined number in the deceleration area.

9. An apparatus according to claim 8, wherein the first predetermined number is the number of tracks required that rotation velocity of the stepping motor increases to a predetermined velocity in the acceleration area, the second predetermined number is the number of tracks required that rotation velocity of the stepping motor decreases to the predetermined velocity in the deceleration area, and the predetermined velocity is a maximum rotation velocity of the stepping motor in case that the stepping motor is driven by the one-two-phase excitation method.

10. A method of controlling a stepping motor used for moving a movable body from a first position to a second position, the method comprising the processes of:

calculating a moving distance between the first position and the second position;

setting an acceleration area to accelerate the stepping motor and a deceleration area to decelerate the stepping motor, on the basis of the moving distance;

driving the stepping motor by a one-two-phase excitation method until rotation velocity of the stepping motor increases to a predetermined velocity in the acceleration area;

changing over the excitation method from the one-two excitation method to a two-phase excitation method when rotation velocity of the stepping motor increases to the predetermined velocity in the acceleration area;

driving the stepping motor by the two-phase excitation method after rotation velocity of the stepping motor increases to the predetermined velocity in the acceleration area;

further driving the stepping motor by the two-phase excitation method until rotation velocity of the stepping motor decreases to the predetermined velocity in the deceleration area;

changing over the excitation method from the two-phase excitation method to the one-two-phase excitation method when rotation velocity of the stepping motor decreases to the predetermined velocity in the deceleration area; and driving the stepping motor by the one-two-phase excitation method after rotation velocity of the stepping motor decreases to the predetermined velocity in the deceleration area.

11. A method according to claim 10, wherein the predetermined velocity is a maximum rotation velocity of the stepping motor in case that the stepping motor is driven by the one-two-phase excitation method.

12. A method of controlling a stepping motor used for moving a movable body from a first position to a second position, the method comprising the processes of:

calculating the total number of steps between the first position and the second position;

setting an acceleration area to accelerate the stepping motor and a deceleration area to decelerate the stepping motor, on the basis of the total number of steps;

driving the stepping motor by a one-two-phase excitation method until the number of steps reaches a first predetermined number in the acceleration area;

changing over the excitation method from the one-two excitation method to a two-phase excitation method when the number of steps reaches the first predetermined number in the acceleration area;

driving the stepping motor by the two-phase excitation method after the number of steps reaches the first predetermined number in the acceleration area;

further driving the stepping motor by the two-phase excitation method until the number of steps reaches a second predetermined number in the deceleration area;

changing over the excitation method from the two-phase excitation method to the one-two-phase excitation method when the number of steps reaches the second predetermined number in the deceleration area; and driving the stepping motor by the one-two-phase excitation method after the number of steps reaches the second predetermined number in the deceleration area.

13. A method according to claim 12, wherein
the first predetermined number is the number of steps required that rotation velocity of the stepping motor increases to a predetermined velocity in the acceleration area, the second predetermined number is the number of steps required that rotation velocity of the stepping motor decreases to the predetermined velocity in the deceleration area, and the predetermined velocity is a maximum rotation velocity of the stepping motor in case that the stepping motor is driven by the one-two-phase excitation method.

14. A method according to claim 12 further comprising the processes of:

selecting either one of a one-phase excitation position and a two-phase excitation position as an excitation position at a beginning of the acceleration area, on the basis of the first predetermined number; and moving a rotor of the stepping motor to the selected excitation position by using a microstep method before acceleration of the stepping motor starts.

15. A method of controlling a stepping motor used for moving a movable body from a first position to a second position, the method comprising the processes of:

calculating the total number of steps between the first position and the second position;

setting an acceleration area to accelerate the stepping motor and a deceleration area to decelerate the stepping motor, on the basis of the total number of steps;

calculating the number of steps necessary for accelerating the stepping motor in the acceleration area;

selecting a first driving pattern wherein the stepping motor is driven by only a one-two-phase excitation method during the acceleration area and during the deceleration area, if the calculated number of steps necessary for accelerating is less than a first predetermined number, and selecting a second driving pattern wherein the stepping motor is driven by the one-two-phase excitation method until the number of steps reaches the first predetermined number in the acceleration area, driven by a two-phase excitation method after the number of steps reaches the first predetermined velocity in the acceleration area, driven by the two-phase excitation method until the number of steps reaches a second predetermined number in the deceleration area, and driven by the one-two-phase excitation method after the number of steps reaches the second predetermined number in the deceleration area, if the calculated number of steps necessary for accelerating is not less than the first predetermined number; and driving the stepping motor by the selected driving pattern.

16. A method according to claim 15, wherein
the first predetermined number is the number of steps required that rotation velocity of the stepping motor increases to a predetermined velocity in the acceleration area, the second predetermined number is the number of steps required that rotation velocity of the stepping motor decreases to the predetermined velocity in the deceleration area, and the predetermined velocity is a maximum rotation velocity of the stepping motor in case that the stepping motor is driven by the one-two-phase excitation method.

17. A method of controlling a stepping motor used for moving a carriage from a first position to a second position, the carriage having a pickup to read information from a disc on which a plurality of tracks are formed, the method comprising the processes of:

calculating the total number of tracks between the first position and the second position;

setting an acceleration area to accelerate the stepping motor and a deceleration area to decelerate the stepping motor, on the basis of the total number of tracks;

driving the stepping motor by a one-two-phase excitation method until the number of tracks reaches a first predetermined number in the acceleration area;

changing over the excitation method from the one-two excitation method to a two-phase excitation method when the number of tracks reaches the first predetermined number in the acceleration area;

driving the stepping motor by the two-phase excitation method after the number of tracks reaches the first predetermined number in the acceleration area;

further driving the stepping motor by the two-phase excitation method until the number of tracks reaches a second predetermined number in the deceleration area;

changing over the excitation method from the two-phase excitation method to the one-two-phase excitation method when the number of tracks reaches the second predetermined number in the deceleration area; and driving the stepping motor by the one-two-phase excitation method after the number of tracks reaches the second predetermined number in the deceleration area.

18. An apparatus according to claim 17, wherein
the first predetermined number is the number of tracks required that rotation velocity of the stepping motor increases to a predetermined velocity in the acceleration area, the second predetermined number is the number of tracks required that rotation velocity of the stepping motor decreases to the predetermined velocity in the deceleration area, and the predetermined velocity is a maximum rotation velocity of the stepping motor in case that the stepping motor is driven by the one-two-phase excitation method.

* * * * *